US005952910A

United States Patent [19]

Krause

[11] Patent Number: 5,952,910

[45] Date of Patent: Sep. 14, 1999

[54] ISOLATOR DEVICE FOR ARRESTER

[75] Inventor: John A. Krause, Eastlake, Ohio

[73] Assignee: Hubbell Incorporated, Orange, Conn.

[21] Appl. No.: 08/985,196

[22] Filed: Dec. 4, 1997

[51] Int. Cl.[6] .............................. H01T 4/00; H01H 39/00; H02H 3/22; H02H 1/00

[52] U.S. Cl. .............................. 337/30; 337/28; 337/29; 337/32; 337/34; 361/117-138

[58] Field of Search .............................. 337/28–33, 34

[56] References Cited

U.S. PATENT DOCUMENTS

| | | | |
|---|---|---|---|
| 3,679,938 | 7/1972 | Carothers et al. . | |
| 3,869,650 | 3/1975 | Cunningham et al. | 317/61 |
| 4,204,238 | 5/1980 | Stetson | 361/125 |
| 4,471,402 | 9/1984 | Cunningham | 361/125 |
| 4,609,902 | 9/1986 | Lenk | 337/30 |
| 4,734,823 | 3/1988 | Cunningham . | |
| 5,057,810 | 10/1991 | Raudabaugh | 337/30 |
| 5,113,167 | 5/1992 | Raudabaugh | 337/30 |
| 5,434,550 | 7/1995 | Putt | 337/31 |

FOREIGN PATENT DOCUMENTS

| | | |
|---|---|---|
| 2305310 | 4/1997 | United Kingdom . |

*Primary Examiner*—Leo P. Picard
*Assistant Examiner*—Anatoly Vortman
*Attorney, Agent, or Firm*—Jerry M. Presson; Mark S. Bicks

[57] ABSTRACT

A device for connecting, and then isolating and disconnecting an arrester includes a non-conductive housing with two electrical terminals. The housing has opposite ends separated by an internal chamber. The terminals are mounted at the housing ends. A resistor engages and extends between the terminals in the housing internal chamber. A cartridge with an explosive charge is mounted in the internal chamber adjacent the resistor. A gap spacer surrounds the cartridge, is adjacent one of the terminals and is spaced from the other terminal.

23 Claims, 3 Drawing Sheets

FIG. 1
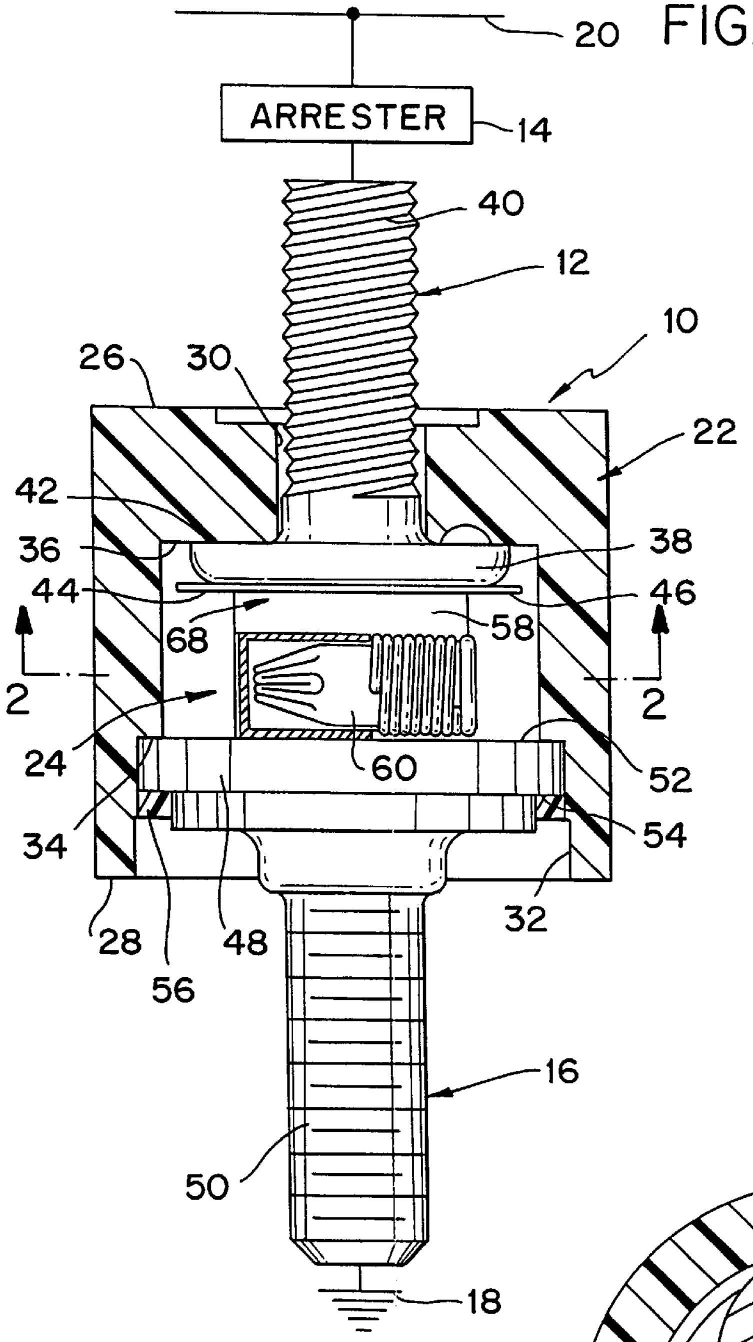
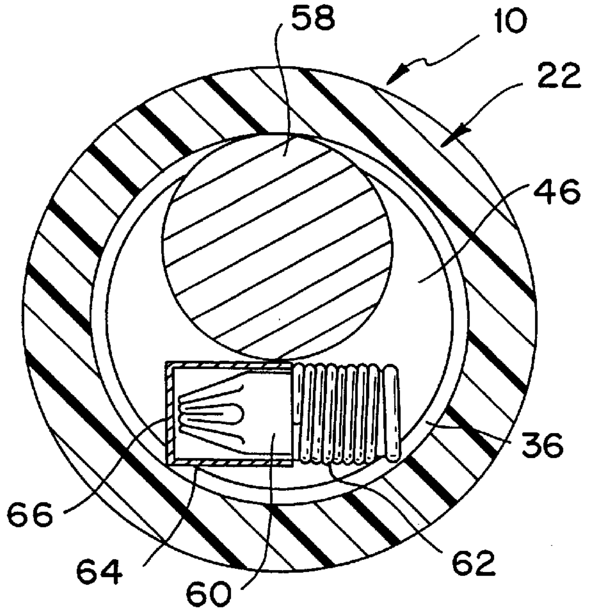
FIG. 2

ISOLATOR DEVICE FOR ARRESTER

FIELD OF THE INVENTION

The present invention relates to a device for connecting and then isolating and disconnecting an arrester between a power line and ground. The arrester is isolated and disconnected upon arrester failure. More particularly, the present invention relates to a device having a pair of electrical terminals coupled by a resistor, a spark gap, a gap spacer and an explosive cartridge.

BACKGROUND OF THE INVENTION

Lighting or surge arresters are typically connected to power lines to carry electrical surge currents to ground, and thus, prevent damage to lines and equipment connected to the arresters. Arresters offer high resistance to normal voltage across power lines but offer very low resistance to surge currents produced by sudden high voltage conditions caused, for example, by lighting strikes, switching surge currents or temporary overvoltages. After the surge, the voltage will drop and the arrester should normally return to a high resistance state. However, upon arrester malfunction or failure, the high resistance state is not resumed, and the arrester continues to provide an electrical path from the power line to ground. Ultimately, the line will fail due to a short circuit condition or breakdown of the distribution transformers, and the arrester will require replacement.

To avoid line failure, disconnectors are commonly used in conjunction with arresters to separate a malfunctioning arrester from the circuit and provide a visual indication of arrester failure. Conventional disconnectors have an explosive charge to destroy the circuit path and physically separate the electrical terminals. Examples of such prior disconnector devices are disclosed in U.S. Pat. Nos. 5,057,810 and 5,113,167 to Raudabaugh, as well as U.S. Pat. No. 5,434,550 to Putt and U.S. Pat. No. 4,471,402 to Cunningham, the subject matter of each of which is hereby incorporated by reference.

However, these conventional disconnector devices comprise a relatively large number of intricate parts which are relatively expensive to manufacture and assemble. Additionally, their configurations have relatively high reaction times for detonation due to the limited exposure of the cartridge.

SUMMARY OF THE INVENTION

An object of the present invention is to provide a device that reliably and quickly reacts to disconnect a malfunctioning arrester from ground.

Another object of the present invention is to provide a device for connecting and then isolating and disconnecting an arrester between a power line and ground that is durable, operates efficiently and is simple and inexpensive to manufacture and assemble.

The foregoing objects are basically obtained by a device for connecting and then isolating and disconnecting an arrester comprising a non-conductive housing, first and second electrical terminals, a resistor, a cartridge, and a gap spacer. The housing has first and second opposite ends separated by an internal chamber. The first and second terminals are mounted respectively at the first and second ends of the housing. The resistor engages and extends between the first and second terminals and the internal chamber. The cartridge has an explosive charge mounted in the chamber adjacent the resistor. The gap spacer surrounds the cartridge, is adjacent the second terminal, and is spaced from the first terminal.

In this manner, the cartridge, gap spacer and resistor define the gap which sets the detonation characteristic of the isolator. The gap spacer is the termination point for the arc and protects the cartridge during proper operation of the arrester (i.e., when the arrester is not malfunctioning).

The simple parts of the present invention can be easily formed and easily assembled to form the device. This reduces the cost of manufacturing the parts and assembling the parts to form the device.

The present invention also allows the cartridge to be placed perpendicular to the axis of the housing and electrical terminals. This orientation of the cartridge allows more energy from the arc created as a result of a fault condition to be transferred to the cartridge, thereby causing the cartridge to detonate faster. Better coordination with fuse curves can be achieved by varying the gap and the mass of the gap spacer in the design of the present invention.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a side elevational view in section of a device according to a first embodiment of the present invention;

FIG. 2 is a bottom plan view in section taken along line 2—2 of FIG. 1;

DETAILED DESCRIPTION OF THE INVENTION

Figure 3:
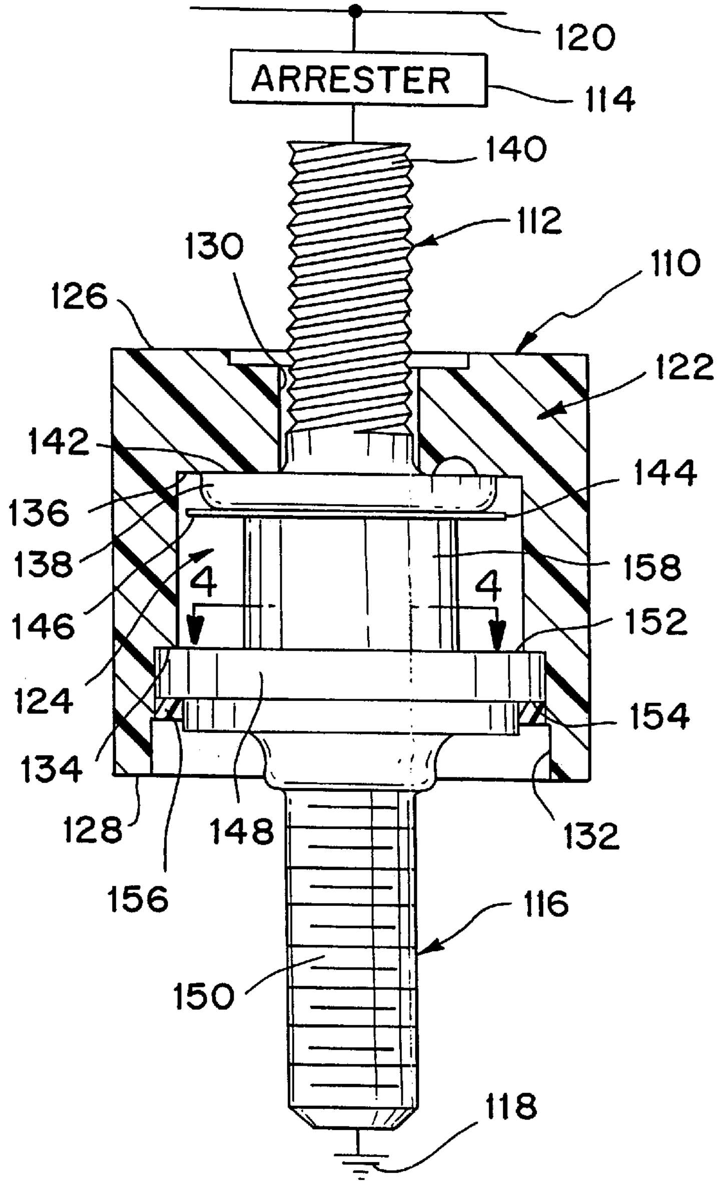
FIG. 3 is a side elevational view in section of a device according to a second embodiment of the present invention.

Referring initially to FIGS. 1 and 2, an isolator-disconnector assembly or device 10, according to a first embodiment of the present invention, comprises a first, upper electrical terminal 12 electrically connected to arrester 14, and a second, lower electrical terminal 16 electrically connected to ground 18. Arrester 14 is electrically connected to power line 20, which is representative of a power system. Terminals 12 and 16 are mechanically and electrically coupled to each other.

Arrester 14 is conventional, and thus, is not described in detail. The arrester can be formed according to U.S. Pat. No. 4,656,555 to Raudabaugh, the subject matter which is hereby incorporated by reference.

Terminals 12 and 16 are mechanically connected to one another by a hollow, non-conductive housing 22. Housing 22 can be formed of any suitably strong insulating material, such as plastic. The hollow interior of the housing defines an internal chamber 24 which extends between the opposite ends 26 and 28 of housing 22. Chamber 24 is connected to upper end 26 by a cylindrical bore 30. The lower end of chamber 24 is connected to end 28 by a stepped lower chamber 32. The lower chamber is formed by sections of different transverse diameters, with each transverse diameter thereof being greater than the constant transverse diameter of internal chamber 24.

Between chambers 24 and 32, the housing has a radially inwardly extending lower shoulder 34 which is of annular configuration. An upper shoulder 36 extends radially at the interface of interior chamber 24 and upper bore 30.

Upper electrical terminal 12 is of conventional construction, and has a head portion 38 located within interior chamber 24 and abutting upper shoulder 36. An externally threaded shank portion 40 extends from the head portion through upper bore 30, such that shank portion 40 is at least partially exposed exteriorly of housing 22. In this manner, head portion surface 42 engages upper shoulder 36, while head portion surface 44 is exposed in the interior of internal chamber 24.

A metallic spring 46 is located in interior chamber 24, and abuts surface 44 of terminal head portion 38. Spring 46 provides a biasing force to maintain electrical or physical contact of the components within internal chamber 24 electrically connecting terminal 12 to terminal 16 by resistor 58, after assembly.

Second terminal 16 is also conventional and has a head portion 48 and a threaded shank portion 50. Head portion 48 has an upper surface 52 facing into chamber 24 and abutting housing lower shoulder 34. The opposite surface 54 of head portion 48 is stepped. Terminal 16 is maintained in position in housing 22 by engagement of its head portion with housing lower shoulder 34 and by a suitable adhesive 56 contacting head portion surface 54 and the stepped lower chamber 32 of housing 22.

A solid cylindrical resistor 58 is mounted in internal chamber 24 and extends between spring 46 and head portion 48 of second terminal 16 providing a resistive electrical connection between the two terminals. Resistor 58 is formed of carbon, ceramic or polymer. Such resistor is simpler and less expensive to form than a ring shaped resistor of the type used in conventional isolators.

A cartridge 60 with an explosive charge is mounted in internal chamber 24 adjacent resistor 58. The cartridge is elongated along a cartridge axis which is substantially perpendicular to the longitudinal axis of terminals 12 and 16 and of housing 22. The configuration of the cartridge is generally cylindrical with one end being tapered. The lateral exterior of the cartridge is substantially covered or surrounded by a gap spacer. The gap spacer comprises a conductive portion 62 formed of an elongated conductor spirally wrapped about a cylindrical surface of cartridge 60, and a circular cylindrical sleeve portion 64 of electrically insulating material. The conductive portion can alternatively be a metallic cylinder. Conductive portion 62 and insulating sleeve portion 64 are axially spaced along the cartridge axis. The end of sleeve portion 64 remote from conductive portion 62 is closed by the end portion 66 of the sleeve portion. Cartridge 60, with surrounding gap spacer 62 and 64, is adjacent an outer surface of resistor 58. Essentially, the cartridge and gap spacer are perpendicular to the longitudinal axis of and tangential to the outer surface of the resistor.

As illustrated in FIG. 1, the space within internal chamber 24 between gap spacer 62 and 64 and spring 46 provides a spark gap 68.

In an alternative arrangement of the embodiment of FIG. 1, a rubber spacer can be included within internal chamber 24 to engage and trap the cartridge from moving within the internal chamber. The rubber spacer may be a polymer gasket which traps the cartridge on its end opposite the gap spacer of the cartridge assembly. Also, the rubber spacer can be bigger and cover the entire cartridge with a hole over the gap spacer to allow for arc travel.

The design of the first embodiment of the present invention allows the cartridge assembly to be fixed to the inside of the insulator, for example, by use of a spacer, or can be used without such a spacer allowing the cartridge assembly to move around within isolator housing 22. However, allowing such movement may cause the assembly to rattle which may be considered to be undesirable in certain environments.

By forming the isolator in this manner, the isolator can be incorporated in an integral part of an arrester support bracket or can be formed as a separate isolator. The gap between spring 46 and the gap spacer 62 and 64 sets the detonation characteristics of the isolator. The size of the gap is controlled in the assembly by the height of the resistor and the height of the gap spacer. The gap spacer is the termination point for the arc and protects the cartridge from detonation while the arrester is functioning properly.

The perpendicular orientation of the cartridge relative to the terminal longitudinal axis allows more energy from an arc, generated under fault conditions, to be transferred to the cartridge. This greater energy transfer provides for faster cartridge detonation. Adjustment of the gap and the mass of the gap spacer of the design facilitates coordination with fuse curves, providing proper operational characteristics, as desired.

The arrangement of the parts facilitates assembly by allowing the parts to be easily and simply dropped into the internal cavity of the housing. First terminal 12 is inserted through bore 30. The spring, resistor and cartridge with its surrounding gap spacer, are then dropped into the cavity over terminal 12. The internal cavity 24 is then closed by terminal 16 and is then secured by adhesive 56 to complete the assembly.

During normal non-fault operation of the arrester, little or no current passes through the isolator due to the high resistance of the arrester. When subjected to lighting or surge currents, the arrester experiences high pulse currents which travel through the arrester and isolator. Within the isolator, the current will arc over between spring 46 and conductive portion 62 of the gap spacer for connection to terminal 16 and to ground 18.

When the arrester is properly functioning, the gaps spark over for high current, short duration pulses which last less than 100 milliseconds for lightening and less than several milliseconds for switching currents. For such short sparkovers, insufficient energy is generated to activate or denote the cartridge. However, if the lightening arrester fails to withstand the voltages, the arcs will be generated over a sufficiently extended period to activate the unprimed cartridge, causing explosion which separates the terminals mechanically from one another. The force of the exploded charge forces at least one of the terminals, usually second terminal 16, from the housing. This action electrically disconnects the arrester from the system, and provides a visual indication of the need for arrester replacement.

Referring now to FIGS. 3–6, an isolator-disconnector assembly or device 110, according to a second embodiment of the present invention, comprises a first, upper electrical terminal 112 electrically connected to arrester 114, and a second, lower electrical terminal 116 electrically connected to ground 118. Arrester 114 is electrically connected to power line 120, which is representative of a power system. Terminals 112 and 116 are mechanically and electrically coupled to each other.

Arrester 114 is conventional like arrester 14, and thus, is not described in detail.

Terminals 112 and 116 are mechanically connected to one another by a hollow, non-conductive housing 122. Housing 122 can be formed of any suitably strong insulating material, such as plastic. The hollow interior of the housing defines an internal chamber 124 which extends between the opposite ends 126 and 128 of housing 122. Chamber 124 is connected to upper end 126 by a cylindrical bore 130. The lower end of chamber 124 is connected to end 128 by a stepped lower chamber 132. The lower chamber is formed by sections of different transverse diameters, with each transverse diameter thereof being greater than the transverse diameter of internal chamber 124.

Between chambers 124 and 132, the housing has a radially inwardly extending lower shoulder 134 which is of annular configuration. An upper shoulder 136 extends radially at the interface of interior chamber 124 and upper bore 130.

Upper electrical terminal 112 is of conventional construction, and has a head portion 138 located within interior chamber 124 and abutting upper shoulder 136. An externally threaded shank portion 140 extends from the head portion through upper bore 130, such that shank portion 140 is at least partially exposed exteriorly of housing 122. In this manner, head portion surface 142 engages upper shoulder 136, while head portion surface 144 is exposed in the interior of internal chamber 124.

A metallic spring 146 is located in interior chamber 124, and abuts surface 144 of terminal head portion 138. Spring 146 provides a biasing force to maintain electrical or physical contact of the components within internal chamber 124 electrically connecting terminal 112 to terminal 116 by resistor 158 after assembly.

Second terminal 116 is also conventional and has a head portion 148 and a threaded shank portion 150. Head portion 148 has an upper surface 152 facing into chamber 124 and abutting housing lower shoulder 134. The opposite surface 154 of head portion 148 is stepped. Terminal 116 is maintained in position in housing 122 by engagement of its head portion with housing lower shoulder 134 and by a suitable adhesive 156 contacting head portion surface 154 and the stepped lower chamber 132 of housing 122.

A hollow, cylindrical resistor 158 is mounted in internal chamber 124 and extends between spring 146 and head portion 148 of second terminal 116 providing a resistive electrical connection between the two terminals. Resistor 158 is formed of carbon, ceramic or polymer.

The hollow interior of resistor 158 houses a cartridge 160 with an explosive charge. Cartridge 160 is elongated and extends along a cartridge axis substantially perpendicular to the longitudinal axis of terminals 112 and 116 and housing 122.

A gap spacer having a conductive portion 162 and a sleeve portion 164 of insulating material surrounds the cartridge and can abut upper surface 152 of second terminal head portion 148. Electrically conductive portion 162 is formed of a spirally round conductor wound about the cartridge or a metal cylinder. The end of sleeve portion 164 remote from the conductive portion is closed by an end portion 166.

The cartridge and gap spacer extend diametrically across the cylindrical hollow interior of resistor 158. Since the axial length of the cartridge and gap spacer is less than the transverse diameter of the hollow interior of the resistor, a wedge gasket 168 is provided with a friction fit between the axial end of cartridge 160, remote from sleeve portion 164, and the adjacent inner surface portion of resistor 158. The wedge gasket provides a tight fit for the cartridge and spacer so that it does not move within the resistor.

Figure 4:
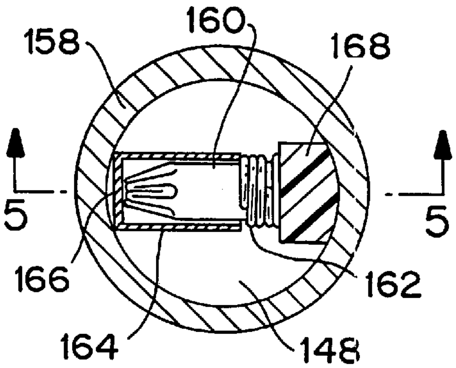
FIG. 4 is a partial, top plan view in section taken along lines 4-4 of FIG. 3.
Figure 5:
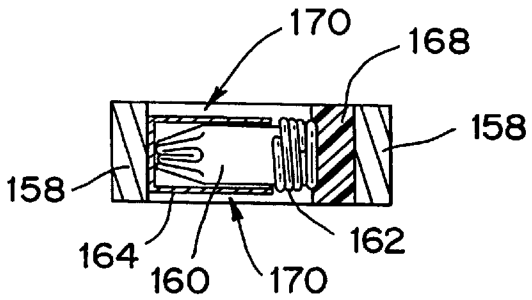
FIG. 5 is a partial, side elevational view in section taken along lines 5—5 of FIG. 4.

In the embodiment of FIGS. 3–5, the spark gaps 170 are provided between spring 146 and the cartridge and gap spacer and between the gap spacer and surface 152 of second terminal head portion 148. The size of this gap can be further adjusted by the positive location of the cartridge and gap spacer within the hollow interior of resistor 158, which can even allow the cartridge and gap spacer to be spaced above surface 152 of second terminal head portion 148.

The assembly of the arrester of the second embodiment is similar to that of the first embodiment. However, the resistor, cartridge, gap spacer and wedge gasket can be pre-assembled prior to insertion of such pre-assembly within internal chamber 124 of housing 122. Additionally, the operation of the second embodiment is the same as the first embodiment.

Figure 6:
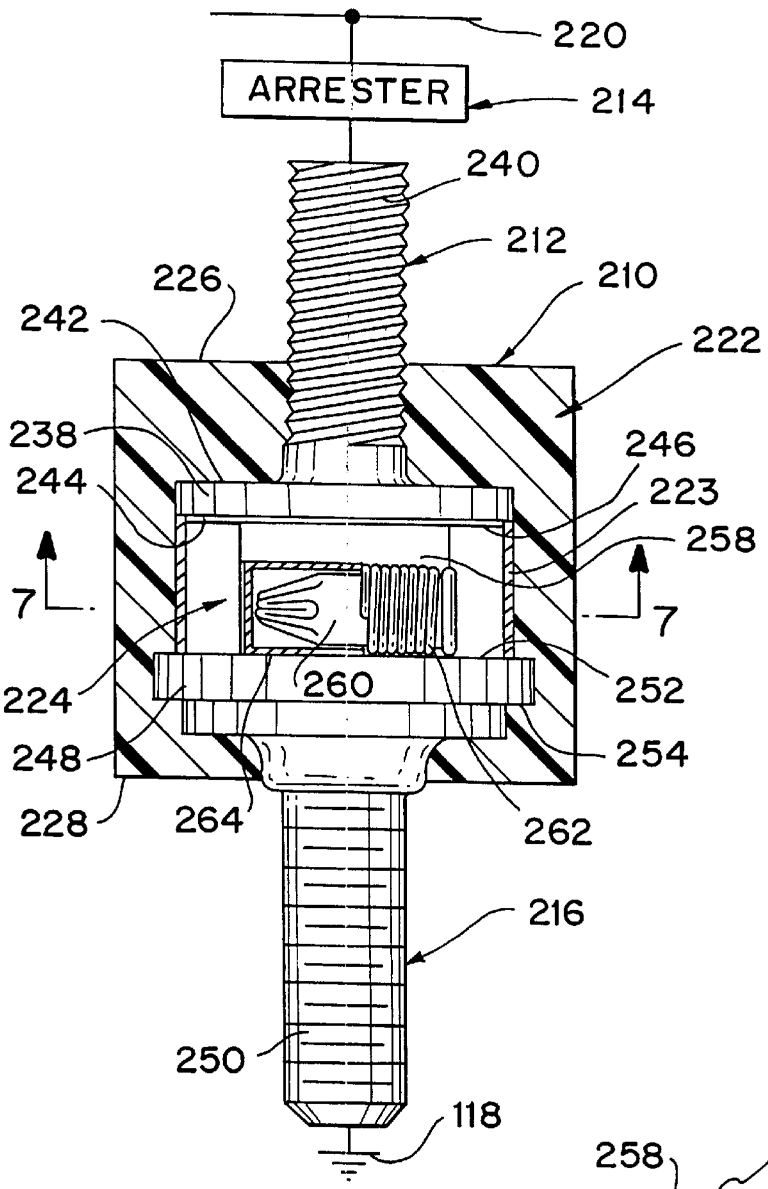
FIG. 6 is a side elevational view in section of a device according to a third embodiment of the present invention.
Figure 7:
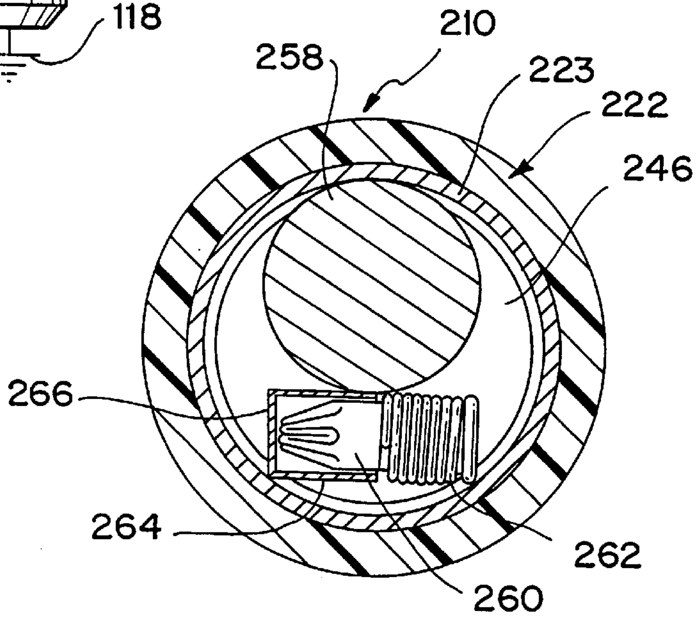
FIG. 7 is a bottom plan view in section taken along line 7—7 of FIG. 6.

Referring now to FIGS. 6 and 7, an isolator-disconnector assembly or device 210, according to a third embodiment of the present invention, comprises a first, upper electrical terminal 212 electrically connected to arrester 214, and to second, lower electrical terminal 216 electrically connected to ground 218. Arrester 214 is electrically connected to power line 220, which is representative of a power system. Terminals 212 and 216 are mechanically and electrically coupled to each other.

Arrester 214 is conventional, and thus, is not described in detail. The arrester can be formed according to U.S. Pat. No. 4,656,555 to Raudabaugh, the subject matter which is hereby incorporated by reference.

Terminals 212 and 216 are mechanically connected to one another by a hollow, non-conductive housing 222. Housing 222 is poured or cast about terminals 212 and 216 and the other isolator components of any suitably strong insulating material, such as epoxy. A hollow cylindrical insulating tube 223 forms the hollow interior of the housing to define an internal chamber 224 which extends between the opposite ends 226 and 228 of housing 222 and between the terminals.

Upper electrical terminal 212 is of conventional construction, and has a head portion 238 molded within housing 222 at the upper end of chamber 224. An externally threaded shank portion 240 extends from the head portion through the housing, such that shank portion 240 is at least partially exposed exteriorly of housing 222. In this manner, head portion 238 is positively engaged in the housing with its surface 242 covered by housing portions, while head portion surface 244 is exposed in the interior of internal chamber 224 and abuts an upper end of insulating tube 223.

A metallic spring 246 is located in interior chamber 224 and within insulating tube 223, and abuts surface 244 of terminal head portion 238. Spring 246 provides a biasing force to maintain electrical or physical contact of the components within internal chamber 224 electrically connecting terminal 212 to terminal 216 by resistor 258, after assembly.

Second terminal 216 is also conventional and has a head portion 248 and a threaded shank portion 250. Head portion 248 has an upper surface 252 facing into chamber 224 and abutting a lower end of insulating tube 223. The opposite surface 254 of head position 248 is stepped and covered by portions of housing 222. Terminal 216 is maintained in position in housing 222 by engagement of its head portion with adjacent housing portions.

A solid cylindrical resistor 258 is mounted in internal chamber 224 and extends between spring 246 and head portion 248 of second terminal 216 providing a resistive electrical connection between the two terminals. Resistor 258 is formed of carbon, ceramic or polymer. Such resistor is simpler and less expensive to form than a ring shaped resistor of the type used in conventional isolators.

A cartridge 260 with an explosive charge is mounted in internal chamber 224 adjacent resistor 258. The cartridge is elongated along a cartridge axis which is substantially perpendicular to the longitudinal axis of terminals 212 and 216 and of housing 222. The configuration of the cartridge is generally cylindrical with one end being tapered. The lateral exterior of the cartridge is substantially covered or surrounded by a gap spacer. The gap spacer comprises a conductive portion 262 formed of an elongated conductor spirally wrapped about or a hollow metal cylinder coaxially mounted about a cylindrical surface of cartridge 260, and a circular cylindrical sleeve portion 264 of electrically insulating material. Conductive portion 262 and insulating sleeve portion 264 are axially spaced along the cartridge axis. The end of sleeve portion 264 remote from conductive portion 262 is closed by the end portion 266 of the sleeve portion. Cartridge 260 with surrounding gap spacer 262 and 264, is adjacent an outer surface of resistor 258. Essentially, the cartridge and gap spacer are perpendicular to the longitudinal axis of and tangential to the outer surface of the resistor.

In an alternative arrangement of the third embodiment, a rubber spacer can be included within internal chamber 224 to engage and trap the cartridge from moving within insulating tube 223. The rubber spacer may be a polymer gasket which traps the cartridge on its end opposite the gap spacer of the cartridge assembly. Also, the rubber spacer can be bigger and cover the entire cartridge with a hole over the gap spacer to allow for arc travel.

The design of the third embodiment of the present invention allows the cartridge assembly to be fixed to the inside of the insulator, for example, by use of a spacer, or can be used without such a spacer allowing the cartridge assembly to move around within insulator housing 222. However, allowing such movement may cause the assembly to rattle which may be considered to be undesirable in certain environments.

The third embodiment arrangement of the parts facilitates assembly by allowing the terminals and internal parts (i.e., the insulating tube, resistor, cartridge and gap spacer) to be easily and simply molded or cast within the housing. First, the terminals and internal parts are mounted in a suitable mold. Then, the epoxy is inserted in the mold about the terminals and internal parts to form the illustrated assembly. After the epoxy has solidified, the completed isolator assembly 210 is removed from the mold.

The insulating tube, spring, resistor, cartridge and gap spacer, with or without a wedge gasket, can be pre-assembled prior to insertion of such pre-assembly within the mold. The operation of the third embodiment is the same as the first embodiment.

While various embodiments have been chosen to illustrate the invention, it will be understood by those skilled in the art that various changes and modifications can be made therein without departing from the scope of the invention as defined in the appended claims.

What is claimed is:

1. A device for connecting and then isolating and disconnecting an arrester, comprising:

a non-conductive housing having first and second opposite ends separated by an internal chamber;

a first electrical terminal mounted at said first end;

a second electrical terminal mounted at said second end, said terminals and said housing extending along a longitudinal axis;

a resistor engaging and extending between said first and second terminals in said internal chamber along an axis parallel to and laterally offset relative to said longitudinal axis;

a cartridge with an explosive charge mounted in said chamber adjacent said resistor; and a gap spacer surrounding said cartridge, being adjacent said second terminal and being spaced from said first terminal.

2. A device according to claim 1 wherein said gap spacer comprises an electrically conductive first portion and an electrically non-conductive second portion.

3. A device according to claim 2 wherein said first portion comprises an elongated conductor spirally wound about a section of said cartridge.

4. A device according to claim 3 wherein said second portion comprises a sleeve of insulation extending about a section of said cartridge.

5. A device according to claim 2 wherein said second portion comprises a sleeve of insulation extending about a section of said cartridge.

6. A device according to claim 1 wherein said cartridge extends along an axis substantially perpendicular to said longitudinal axis.

7. A device according to claim 6 wherein said cartridge is adjacent an outer surface of said resistor.

8. A device according to claim 6 wherein said resistor comprises a hollow interior; and said cartridge extends diametrically across said hollow interior.

9. A device according to claim 8 wherein a wedge gasket extends between said cartridge and said resistor.

10. A device according to claim 6 wherein an insulating tube extends between said terminals and about said resistor, said cartridge and said gap spacer, and defines said internal chamber; and said housing is molded about said insulating tube, said terminals, said resistor, said cartridge and said gap spacer.

11. A device for connecting and then isolating and disconnecting an arrester, comprising:

a hollow, non-conductive housing having first and second opposite ends separated by an internal chamber and spaced along a longitudinal axis;

a first electrical terminal having a first head portion positioned in said internal chamber adjacent said first end and a first shank portion extending from said housing at said first end;

a second electrical terminal having a second head portion positioned in said internal chamber adjacent said second end and a second shank portion extending from said housing at said second end;

a spring member in said internal chamber and connected to said first head portion;

a resistor mounted in said internal chamber, and engaging and extending between said spring member and second head portion along a resistor axis;

a cartridge with an explosive charge mounted in said internal chamber adjacent said resistor and extending along a cartridge axis substantially perpendicular to said longitudinal axis; and a gap spacer surrounding said cartridge, being adjacent said second terminal and being spaced from said first terminal, said gap spacer having an electrically conductive first portion and an electrically non-conductive second portion axially spaced along said cartridge axis.

12. A device according to claim 11 wherein said first portion comprises an elongated conductor spirally wound about a section of said cartridge.

13. A device according to claim 12 wherein said second portion comprises a sleeve of insulation extending about a section of said cartridge.

14. A device according to claim 11 wherein said second portion comprises a sleeve of insulation extending about a section of said cartridge.

15. A device according to claim 11 wherein said resistor axis is parallel to and laterally offset relative to said longitudinal axis.

16. A device according to claim 15 wherein said cartridge is adjacent an outer surface of said resistor.

17. A device according to claim 11 wherein said resistor comprises a hollow interior; and said cartridge extends diametrically across said hollow interior.

18. A device according to claim 17 wherein a wedge gasket extends between said cartridge and said resistor.

19. A device according to claim 11 wherein an insulating tube extends between said terminals and about said resistor, said cartridge and said gap spacer, and defines said internal chamber; and said housing is molded about said insulating tube, said terminals, said resistor, said cartridge and said gap spacer.

20. A device for connecting and then isolating and disconnecting an arrester, comprising:

a non-conductive housing having first and second opposite ends separated by an internal chamber;

a first electrical terminal mounted at said first end;

a second electrical terminal mounted at said second end;

a resistor engaging and extending between said first and second terminals in said internal chamber;

a cartridge with an explosive charge mounted in said chamber adjacent said resistor; and a gap spacer surrounding said cartridge, being adjacent said second terminal, being spaced from said first terminal, and including an electrically conductive first portion and an electrically non-conductive second portion.

21. A device according to claim 20 wherein said first portion comprises an elongated conductor spirally wound about a section of said cartridge.

22. A device according to claim 21 wherein said second portion comprises a sleeve of insulation extending about a section of said cartridge.

23. A device according to claim 20 wherein said second portion comprises a sleeve of insulation extending about a section of said cartridge.

* * * * *